US008101128B2

(12) United States Patent
Lobet et al.

(10) Patent No.: US 8,101,128 B2
(45) Date of Patent: Jan. 24, 2012

(54) INJECTOR ASSEMBLIES AND MICROREACTORS INCORPORATING THE SAME

(75) Inventors: Olivier Lobet, Mennecy (FR); Stephane Poissy, Brunoy (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 268 days.

(21) Appl. No.: 12/396,114

(22) Filed: Mar. 2, 2009

(65) Prior Publication Data

US 2009/0297410 A1 Dec. 3, 2009

(30) Foreign Application Priority Data

Feb. 29, 2008 (EP) .................................... 08305039

(51) Int. Cl.
*B01J 19/00* (2006.01)
*B01J 8/00* (2006.01)
*B01J 10/00* (2006.01)

(52) U.S. Cl. ......... 422/130; 422/129; 422/600; 422/603

(58) Field of Classification Search .................. 422/129, 422/130, 306, 600, 603
See application file for complete search history.

(56) References Cited

U.S. PATENT DOCUMENTS

| | | | | |
|---|---|---|---|---|
| 4,960,244 | A | 10/1990 | Maag et al. | 239/424 |
| 6,196,525 | B1 | 3/2001 | Ganan-Calvo | 261/76 |
| 6,321,998 | B1 * | 11/2001 | Schubert et al. | 239/8 |
| 6,802,640 | B2 * | 10/2004 | Schubert et al. | 366/181.6 |
| 6,851,846 | B2 * | 2/2005 | Fujii et al. | 366/173.2 |
| 2004/0055329 | A1 | 3/2004 | Mathias et al. | 62/611 |
| 2004/0132613 | A1 * | 7/2004 | Brophy et al. | 502/150 |
| 2005/0276160 | A1 | 12/2005 | Woehl et al. | 366/336 |
| 2006/0272722 | A1 * | 12/2006 | Yamada et al. | 137/896 |
| 2007/0291581 | A1 * | 12/2007 | Ehrfeld et al. | 366/153.2 |

* cited by examiner

*Primary Examiner* — Walter D Griffin
*Assistant Examiner* — Natasha Young
(74) *Attorney, Agent, or Firm* — Gregory V. Bean

(57) ABSTRACT

A microreactor assembly is provided comprising a fluidic microstructure and an injector assembly. The injector assembly comprises a liquid inlet, a gas inlet, a liquid outlet, a gas outlet, a liquid flow portion extending from the liquid inlet to the liquid outlet, and a gas flow portion extending from the gas inlet to the gas outlet. Further, the injector assembly defines an injection interface with a microchannel input port of the fluidic microstructure. The injector assembly is configured such that the gas outlet of the gas flow portion is positioned to inject gas into the liquid flow portion upstream of the liquid outlet, into the liquid flow portion at the liquid outlet, or into an extension of the liquid flow portion downstream of the liquid outlet and is configured such that gas is injected into the liquid flow portion or the extension thereof as a series of gas bubbles.

5 Claims, 6 Drawing Sheets

INJECTOR ASSEMBLIES AND MICROREACTORS INCORPORATING THE SAME

PRIORITY

This application claims priority to European Patent Application number EP 08305039.3 filed Feb. 29, 2008 titled, "Injector Assemblies and Microreactors Incorporating The Same".

BACKGROUND

The present invention relates to microreactor technology. Microreactors are commonly referred to as microstructured reactors, microchannel reactors, or microfluidic devices. Regardless of the particular nomenclature utilized, the microreactor is a device in which a sample can be confined and subject to processing. The sample can be moving or static, although it is typically a moving sample. In some cases, the processing involves the analysis of chemical reactions. In others, the processing is executed as part of a manufacturing process utilizing two distinct reactants. In still others, a moving or static target sample is confined in a microreactor as heat is exchanged between the sample and an associated heat exchange fluid. In any case, the dimensions of the confined spaces are on the order of about 1 mm. Microchannels are the most typical form of such confinement and the microreactor is usually a continuous flow reactor, as opposed to a batch reactor. The reduced internal dimensions of the microchannels provide considerable improvement in mass and heat transfer rates. In addition, microreactors offer many advantages over conventional scale reactors, including vast improvements in energy efficiency, reaction speed, reaction yield, safety, reliability, scalability, etc.

Microreactors are often used in chemical processes where the reactants comprise liquids and gases and the microreactor is designed to mix gas and liquid reactant phases to produce one or more specific product molecules. In order to perform a high yield or high selectivity gas/liquid reaction, it is often necessary to provide a relatively high interfacial surface area between the gas and liquid phases of the reaction. Although, the gas and liquid phases may exhibit a variety of degrees of miscibility, in many cases the reactants are immiscible under ordinary conditions. Accordingly, the present inventors have recognized the need for microreactor schemes that can improve yield and selectivity, even for relatively immiscible gas and liquid reactants, particularly for microreaction technology at production level.

According to one embodiment of the present invention, a microreactor assembly is provided comprising a fluidic microstructure and an injector assembly. The injector assembly comprises a liquid inlet, a gas inlet, a liquid outlet, a gas outlet, a liquid flow portion extending from the liquid inlet to the liquid outlet, and a gas flow portion extending from the gas inlet to the gas outlet. Further, the injector assembly defines a sealed injection interface with a microchannel input port of the fluidic microstructure. The injector assembly is configured such that the gas outlet of the gas flow portion is positioned to inject gas into the liquid flow portion upstream of the liquid outlet, into the liquid flow portion at the liquid outlet, or into an extension of the liquid flow portion downstream of the liquid outlet. Further, the injector assembly is configured such that gas is injected into the liquid flow portion or the extension thereof as a series of gas bubbles. The resulting microreactor assembly, and the injector assemblies utilized therein, which can be used with a variety of microreactor designs, effectively improves the interfacial surface area within the microstructure without requiring excessive reduction of microchannel dimensions.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
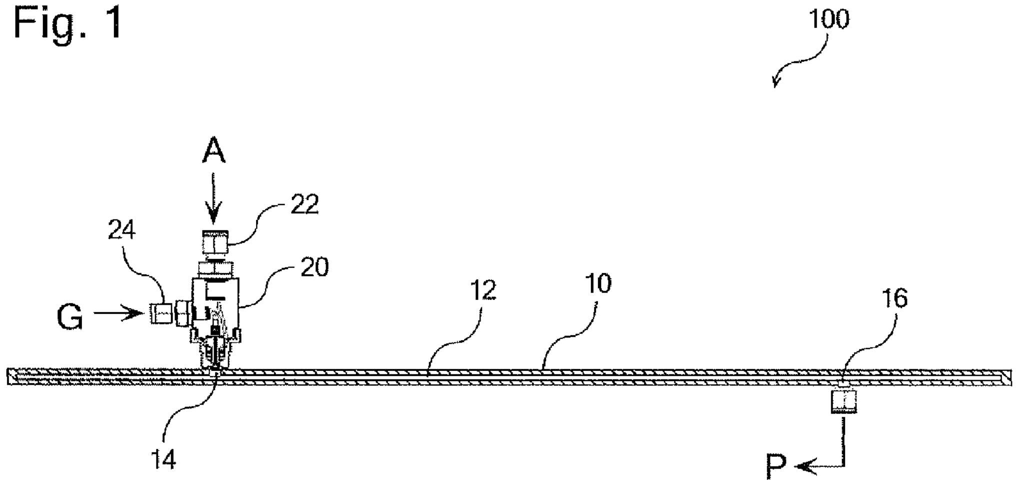
FIG. 1 is a schematic illustration of a microreactor assembly according to one embodiment of the present invention.

Referring to FIG. 1, a microreactor assembly 100 according to one embodiment of the present invention is illustrated. Generally, the microreactor assembly 100 comprises a fluidic microstructure 10 and an injector assembly 20. The fluidic microstructure 10 may be formed from various glasses, ceramics, glass/ceramics, or any other suitable material, and comprises a plurality of fluidic microchannels 12. One or more microchannel input ports 14 and one or more microchannel output ports 16 are provided in fluid communication with the fluidic microchannels 12. The injector assembly 20, one embodiment of which is illustrated in detail in FIGS. 3-5, comprises a liquid inlet 22 for a given liquid reactant A, a gas inlet 24 for a given gas G, a liquid outlet 26, a gas outlet 28, a liquid flow portion 30 extending from the liquid inlet 22 to the liquid outlet 26, and a gas flow portion 40 extending from the gas inlet 24 to the gas outlet 28. A microreactor product P exits the assembly at the microchannel output port 16.

The liquid inlet 22 is configured to define a sealed, readily engageable and disengageable interface with a liquid reactant supply, which may comprise another fluidic microstructure or a liquid source. Similarly, the gas inlet 24 is configured to define a sealed, readily engageable and disengageable interface with a gas reactant supply. In either case, the readily engageable and disengageable interface may be provided in the form of any conventional or yet to be developed fluid fittings, utilizing any suitable sealing configuration including, but not limited to, O-rings, gaskets, etc. It is noted that the recitation of a liquid inlet or liquid outlet as such does not preclude operation of the injector assembly 20 where gas and liquid flow together through the liquid inlet or outlet, as would be the case in the embodiment of FIGS. 3-5 or any embodiment where a gas/liquid flow were to be introduced through the liquid inlet 22.

The injector assembly 20 defines a sealed injection interface with the microchannel input port 14 of the fluidic microstructure 10. In the embodiment illustrated in FIGS. 3-5, the injector assembly 20 is configured such that the gas outlet 28 is positioned to inject gas into the liquid flow portion 30 upstream of the liquid outlet 26. For example, it is contemplated that, the liquid outlet 26 can be displaced from the gas outlet 28 in a downstream direction by less than about 2 mm, although workable variations of this dimension are contemplated. The injector assembly 20 can also be configured such that the gas outlet 28 is positioned to inject gas into the liquid flow portion 30 at the liquid outlet 26 or, as will be described in further detail below with reference to FIGS. 6-8, into an extension of the liquid flow portion 30 downstream of the liquid outlet 26. In any case, the injector assembly 20 is configured such that gas is injected into the liquid flow portion 30, or an extension thereof, as a series of gas bubbles.

Although it is contemplated that the size distribution of the injected gas bubbles will be relatively wide, a majority of the bubbles injected into the liquid flow portion 30 will have a diameter of between approximately 100 μm and approximately 100 μm. In one embodiment of the present invention, where the diameter of the gas outlet 28 is restricted to approximately 60 cm, and the downstream fluidic microstructure 10 contributes a back pressure of about 1.5 bar across the gas outlet, the most prevalent bubble size will fall between approximately 250 μm and approximately 350 μm. As the back pressure approaches about 3.0 bar across the gas outlet, the most prevalent bubble size will tend to fall between approximately 200 μm and approximately 300 μm. It is contemplated that gas outlet diameters suitable for generation of bubbles of this size will typically, but not necessarily, be less than approximately 100 μm or, more preferably, between approximately 30 μm and approximately 80 μm.

Figure 3:
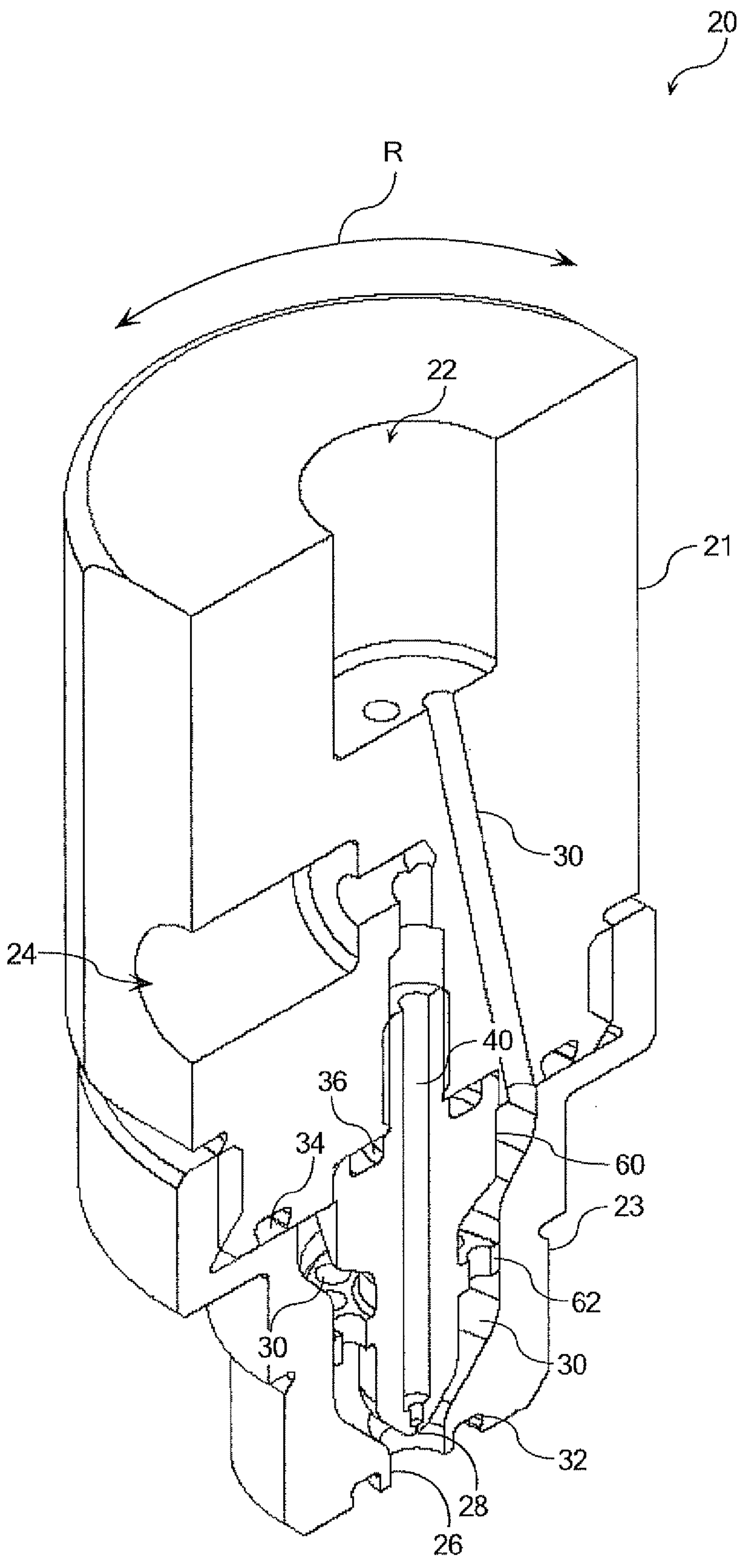
FIG. 3 is a cross-sectional illustration of a portion of an injector assembly according to one embodiment of the present invention.
Figure 4:
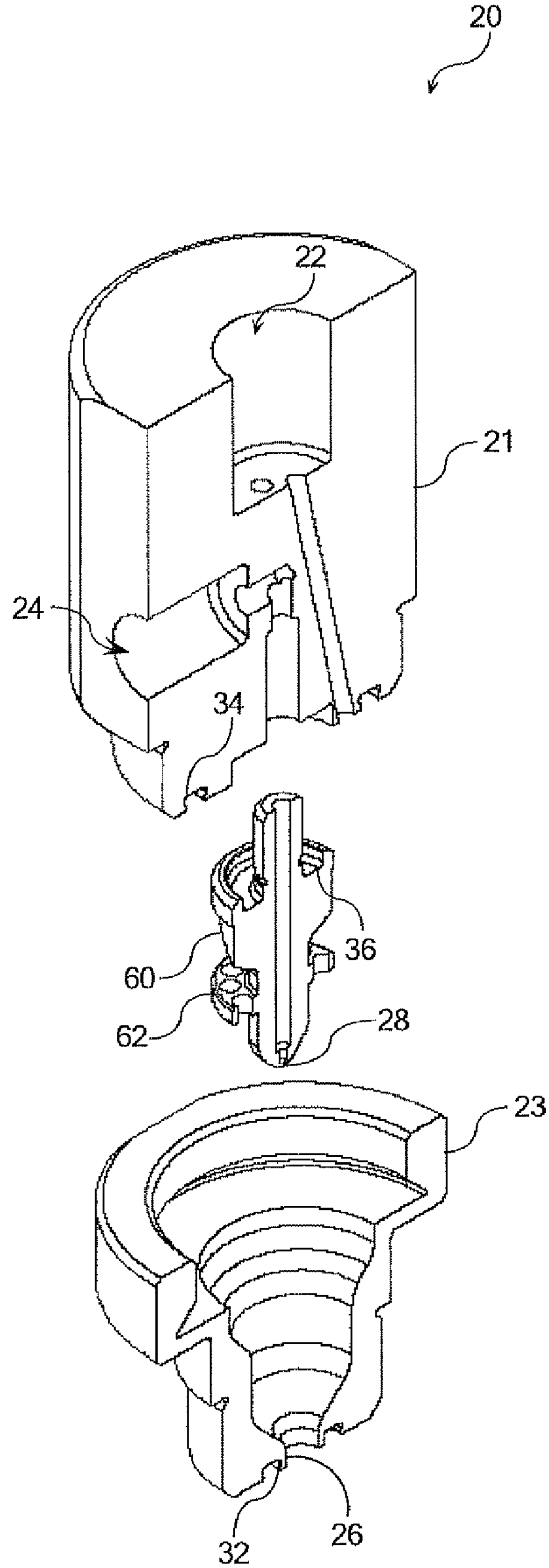
FIG. 4 is an exploded view of the injector assembly illustrated in FIG. 3.
Figure 5:
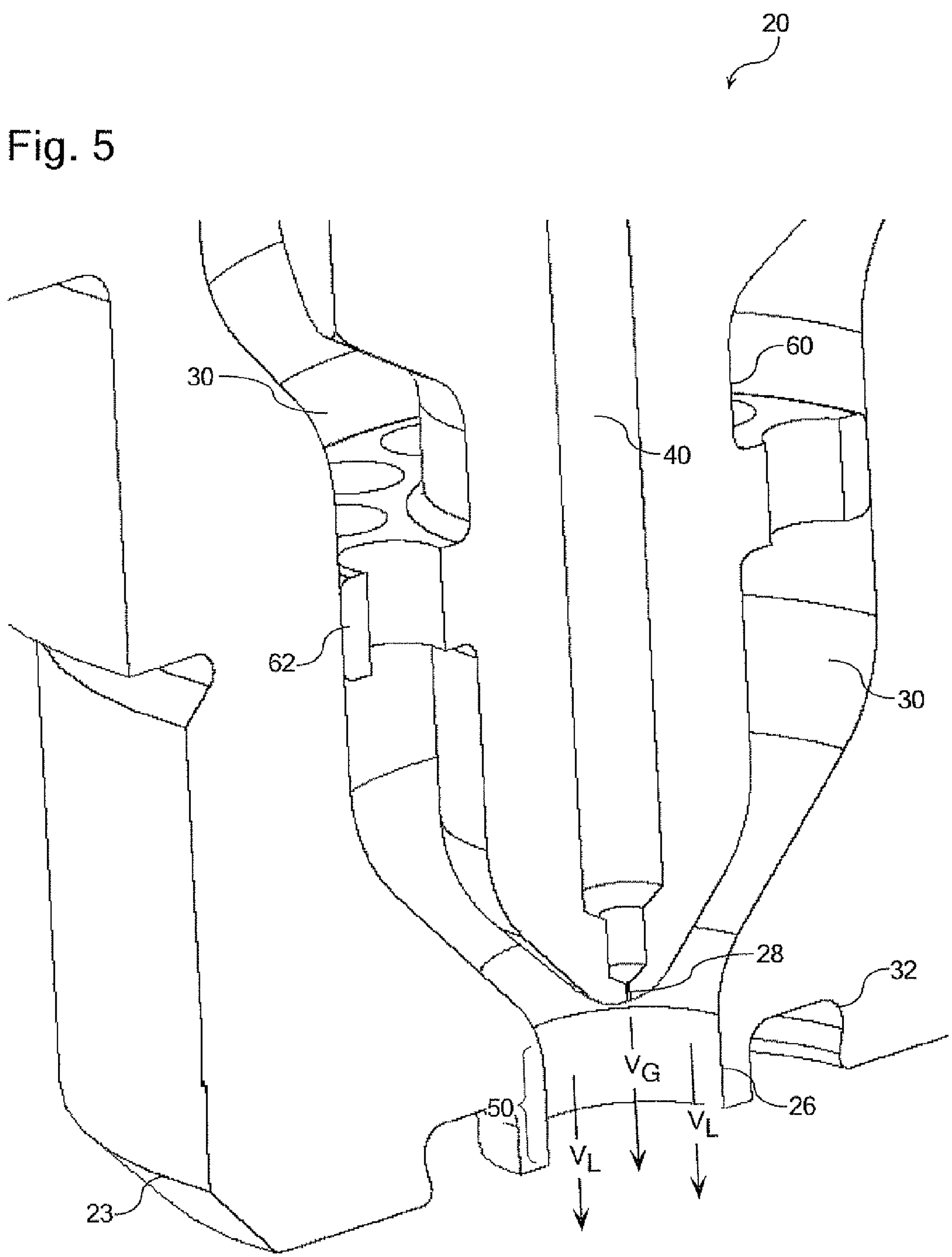
FIG. 5 is a view of a gas/liquid flow portion of the injector assembly of FIGS. 3 and 4.

Referring further to the embodiment illustrated in FIGS. 3-5, the injector assembly 20 can be configured such that the liquid flow portion 30 defines a partially converging cross section and gas is injected from the gas flow portion 40 substantially directly into a non-converging cross section of the liquid flow portion 30 directly downstream of the partially converging cross section of the liquid flow portion 30. Further, injector assembly 20 can be described as comprising a gas/liquid outlet 50 where the liquid flow portion 30 and the gas flow portion 40 meet (see FIG. 5). This gas/liquid outlet 50 can be defined in a relatively restricted nozzle portion of the injector assembly 20 to encourage proper bubble injection and reduce the size distribution of the injected bubbles.

To further encourage proper bubble injection and optimum size distribution, the injector assembly 20 can be configured such that the liquid flow portion 30 and the gas flow portion 40 define substantially co-axial flow paths in the relative vicinity of the point at which gas is injected into the liquid flow portion 30, i.e., in the vicinity of the gas outlet 28. Further, it is contemplated that the gas flow portion 40 can be positioned and configured to inject gas into the liquid flow portion 30 along a gas injection vector $V_G$ that is substantially parallel to the liquid injection vector $V_L$ defined by the liquid flow portion 30 at the liquid outlet 26. Although preferred injector assembly materials are Teflon, PFA, Titanium, Stainless steel, Hastelloy, and Sapphire, it is contemplated that injector assemblies according to the present invention may be constructed of glass, ceramics, glass/ceramic composites, or any other suitable conventional or yet-to-be developed materials.

The present inventors have recognized that in positioning and installing the injector assembly 20 and the associated fluid tubing to be coupled to the gas inlet 24, it would often be beneficial to have the ability to orient the gas inlet 24 of the injector assembly 20 in any of a variety of positions. Accordingly, injector assemblies according to the present invention can be configured to permit active orientation of the gas inlet 24, relative to a remainder of the injector assembly 20, without disruption of the sealed injection interface. For example, referring to FIG. 3, the injector assembly 20 comprises a rotary body portion 21 and a static body portion 23. The sealed injection interface is defined in the static body portion 23 at the liquid outlet 26 and comprises an O-ring seated in an O-ring recess 32 of the injector assembly 20. The rotary body portion 21 and the static body portion 23 are configured to permit active orientation of the rotary body portion 21 as indicated by directional arrow R. A pair of additional O-ring recesses 34, 36 are positioned along interfacial portions of the rotary body portion 21 and the static body portion 23 and O-rings are seated in these recesses to maintain a fluid-tight seal during active orientation. Similar structure can be provided in the injector assembly 20 illustrated below, with reference to FIGS. 6-8.

FIGS. 3-5 also illustrate interchangeable flow regulating unit 60 of the injector assembly 20. The interchangeable flow regulating unit 60 allows for convenient interchange of the components that help define the liquid and gas flow portions 30, 40 and, as a result, provides for a more versatile assembly—particularly where it may be necessary to alter the size, distribution, or injection properties of the gas bubbles. Generally, the interchangeable flow regulating unit 60 comprises the gas outlet 28 and a liquid flow restrictor 62. The liquid flow restrictor 62 is positioned upstream of the gas outlet 28 and serves to regulate the flow of fluid along the liquid flow portion 30.

Figure 2:
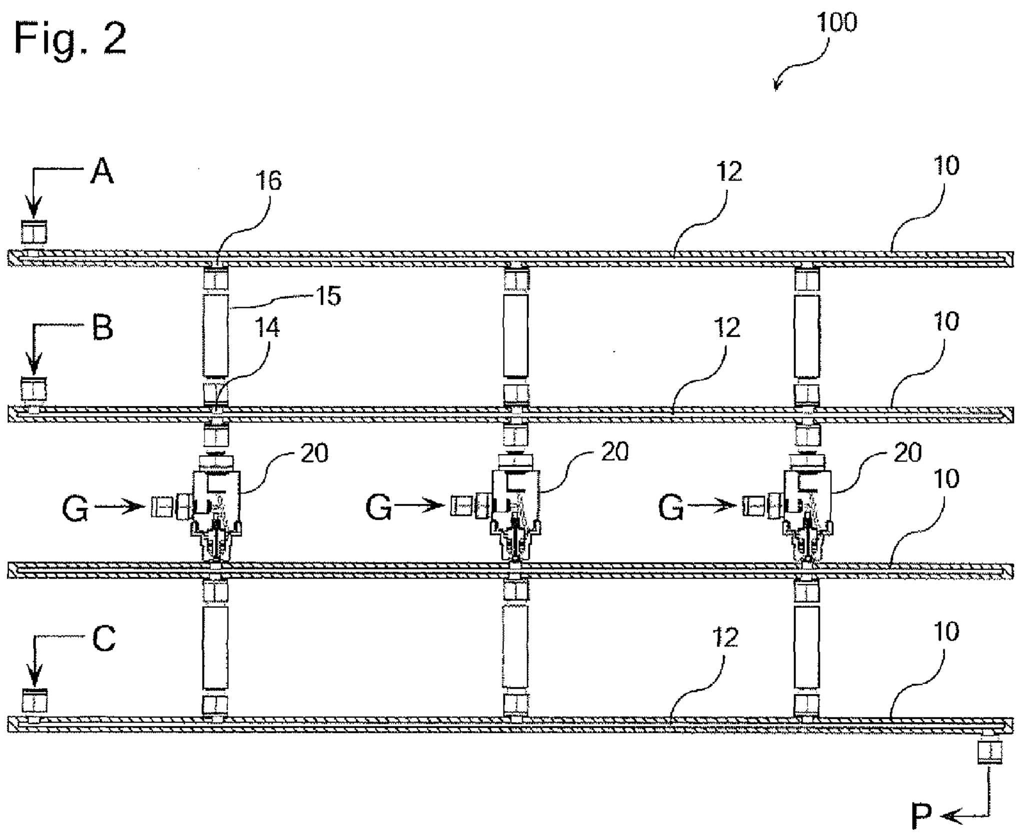
FIG. 2 is a schematic illustration of a microreactor assembly according to another embodiment of the present invention.

Referring to FIG. 2, it is contemplated that microreactor assemblies 100 according to the present invention may comprise a plurality of fluidic microstructures 10 and one or more injector assemblies 20 in communication therewith. In such embodiments, the injector assemblies may comprise identical or dissimilar nozzle dimensions. Further, each injector assembly 20 will define an additional sealed interface with a microchannel output port 16 of an additional fluidic microstructure 10. In this manner, the liquid flow portion 30 will extend from the microchannel output port 16 of one fluidic microstructure 10 to the microchannel input port 14 of another fluidic microstructure 10. This type of configuration allows for the introduction of additional reactants A, B, C and additional fluidic microstructures 10 of differing functionality. In this context, it is noted that the present invention is not limited to the use of a specific microreactor configuration or the use of specific microstructures. For example, and not by way of limitation, the fluidic microstructures 10 can be configured to distribute a single reactant, mix two reactants, provide for heat exchange between one or more reactants and a thermal fluid, or to provide quench-flow, hydrolysis, residence time, or other similar functions. Fluid couplings 15 extend between respective microchannel input and output ports 14, 16 in the manner illustrated in FIG. 2.

If the fluidic microstructure 10 is configured to mix two reactants A, G, it will typically comprise fluidic microchannels that are configured to distribute the reactants across a plurality of reactant flow paths. Each of these reactant flow paths would then be subsequently directed to a mixing zone within the microstructure 10 where the reactants mix and react. The fluidic microstructure 10 may also comprise thermal fluid microchannels configured for thermal exchange between a reactant fluid in the fluidic microchannels and a thermal fluid in thermal fluid microchannels defined in the fluidic microstructure 10. Alternatively, the fluidic microstructure 10 may merely be configured as a single function microstructure, i.e., as a fluid distribution microstructure, a thermal exchange mictrostructure, a reactant mixing microstructure, or a multichannel quench-flow or hydrolysis microreactor. The specific design of the fluidic microstructure for any combination of these functions can be gleaned from a variety of teachings in the art, including those present in Corning Incorporated European Patent Applications EP 1 679 115 A1, EP 1 854 536 A1, EP 1 604 733 A1, EP 1 720 650 A0, and other similarly classified European patents and patent applications.

Figure 6:
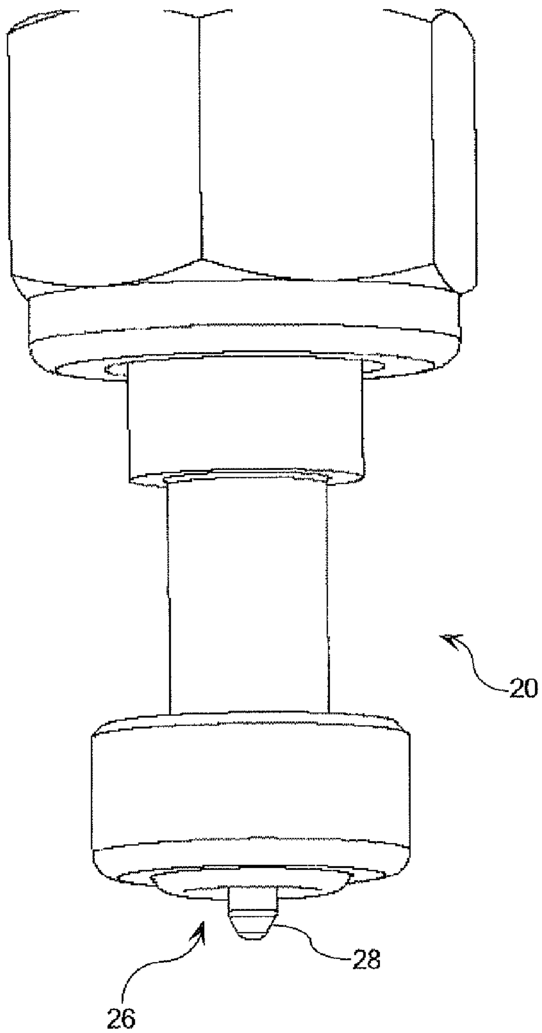
FIGS. 6-8 illustrate an injector assembly according to an alternative embodiment of the present invention.
Figure 7:
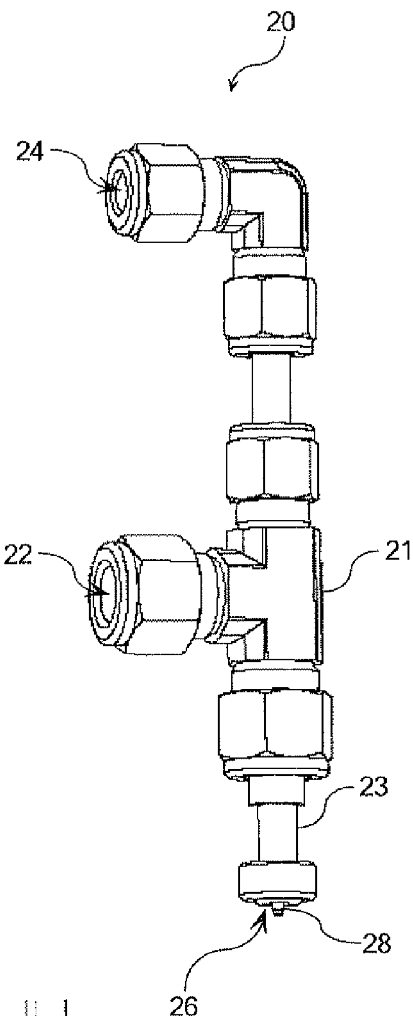
Figure 8:
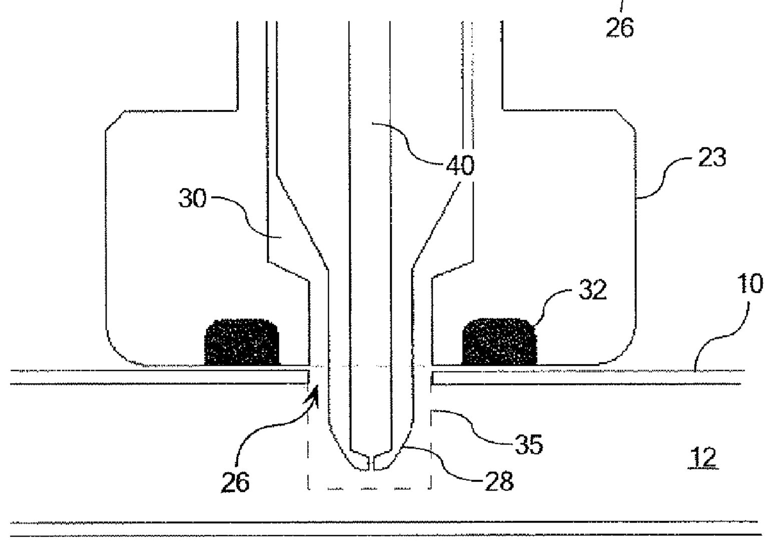

FIGS. 6-8 illustrate an embodiment of the present invention where the injector assembly 20 is configured to place the gas outlet 28 downstream of the sealed injector interface in a fluidic microchannel 12 of the fluidic microstructure 10. More specifically, the injector assembly 20 is configured such that an extension 35 of the liquid flow portion 30 resides at least partially in the fluidic microstructure 10 and the gas outlet 28 of the gas flow portion 40 is positioned to inject gas bubbles into the extension 35 of the liquid flow portion 30, within the fluidic microstructure 10. Typically, the injector assembly 20 will be configured such that the gas outlet is displaced from the sealed injection interface in a downstream direction by less than about 2 mm, although it is appreciated that the bounds of this value will depend largely on the channel configuration of the fluidic microstructure.

FIGS. 6-8 also illustrate the fact that the scope of the present invention is not limited to the specific manner in which the gas and liquid flow portions 30, 40 are presented in the injector assembly 20. More specifically, in FIGS. 3-5, the gas inlet 24 of the gas flow portion 40 is positioned laterally on the rotary body portion 21 of the injector assembly 20, while the liquid inlet 22 of the liquid flow portion 30 is positioned axially on the rotary body portion 21. In contrast, in FIGS. 6-8, the liquid inlet 22 of the liquid flow portion 30 is positioned laterally on the rotary body portion 21 of the injector assembly 20, while the gas inlet 24 extends axially above the rotary body portion 21. It is also noted that the general orientation of the injector assembly, i.e., whether it be positioned above or below the fluidic microstructure 10, may vary depending on the requirements of the particular context in which it is used. Stated differently, in any embodiment of the present invention, the gas bubbles may be injected from above or below the fluidic microstructure 10. Similarly, it is contemplated that the fluidic microstructure 10 may be oriented horizontally, as is illustrated in FIGS. 3-8, vertically, in which case the injector assembly 20 would typically, although not necessarily, assume a generally horizontal configuration, or in any non-vertical or non-horizontal configuration.

It is also contemplated that the liquid and gas inlets 22, 24 of the various embodiments of the present invention may be configured such that the liquid inlet 24 serves only to introduce a purge gas or liquid into the injector assembly 20 and the fluidic microstructure 10 to remove trapped air in the vicinity of the nozzle portion of the injector assembly 20. In this case, the injector assembly 20 would merely send gas into the fluidic microstructure 10 during operation and, in cases where dead volumes would not be acceptable from a process point of view, an injector design is contemplated where the liquid flow portion 30 would be removed. In such a case, the injector assembly 20 could resemble a single part needle of one piece design, with the rotary body portion 21 removed.

Figure 9:
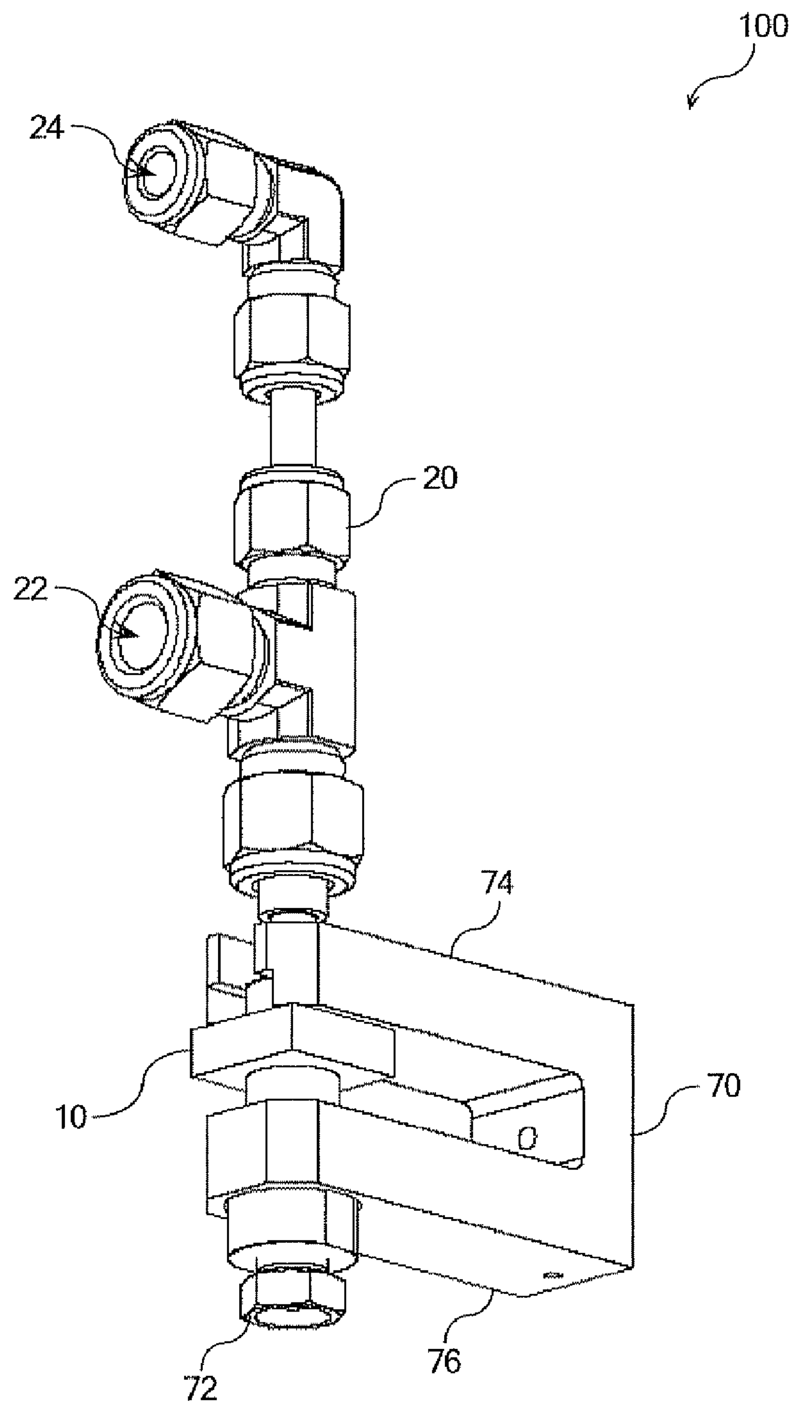
FIG. 9 is an illustration of a microreactor assembly including an assembly clamping mechanism according to one embodiment of the present invention.

Referring to FIG. 9, to facilitate secure installation of injector assemblies 20 within microreactor assemblies 100 according to the present invention, it is contemplated that the microreactor assembly 100 may be provided with a plurality of active or passive assembly clamping mechanisms 70 configured to cooperate with respective fluidic microstructures 10 and injector assemblies 20 so as to engage the injector assemblies 20 and the fluidic microstructures 10 at respective sealed injection interfaces. FIG. 9 is an illustration of a microreactor assembly 100 including a passive assembly clamping mechanism where a fluid coupling 72 is threaded into the clamping mechanism 70 to urge the microfluidic structure 10 against a seal provided between the microfluidic structure 10 and the injector assembly 20 to form a sealed injector interface. Alternatively, it is contemplated that the clamping mechanism 70 may be configured as an active clamping mechanism where the respective arms 74, 76 of the clamp 70 close towards each other to provide a force of compression that would provide the urging force for engaging a seal between the microfluidic structure 10 and the injector assembly 20.

It is noted that recitations herein of a component of the present invention being "configured" in a particular way, to embody a particular property, or function in a particular manner, are structural recitations as opposed to recitations of intended use. More specifically, the references herein to the manner in which a component is "configured" denote an existing physical condition of the component and, as such, are to be taken as a definite recitation of the structural characteristics of the component.

For the purposes of describing and defining the present invention it is noted that the terms "approximately" and "substantially" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A microreactor assembly (100) comprising a fluidic microstructure (10) and an injector assembly (20), wherein:

the fluidic microstructure (10) comprises a plurality of fluidic microchannels (12) and at least one microchannel input port (14) and at least one microchannel output port (16), each in fluid communication with the fluidic microchannels (12);

the injector assembly (20) comprises a liquid inlet (22), a gas inlet (24), a liquid outlet (26), a gas outlet (28), a liquid flow portion (30) extending from the liquid inlet (22) to the liquid outlet (26), and a gas flow portion (40) extending from the gas inlet (24) to the gas outlet (28);

the injector assembly (20) defines an injection interface with the microchannel input port (14) of the fluidic microstructure (10);

the injector assembly (20) is configured such that the gas outlet (28) of the gas flow portion (40) is positioned to inject gas into the liquid flow portion (30) upstream of the liquid outlet (26), into the liquid flow portion (30) at the liquid outlet (26), or into an extension (35) of the liquid flow portion (30) downstream of the liquid outlet (26); and the injector assembly (20) is configured such that gas is injected into the liquid flow portion (30) or the extension thereof as a series of gas bubbles, wherein the injector assembly (20) is configured such that the liquid flow portion (30) defines a partially converging cross section and gas is injected substantially directly into a non-converging cross section of the liquid flow portion (30) substantially directly downstream of the partially converging cross section of the liquid flow portion (30).

2. A microreactor assembly (100) comprising a fluidic microstructure (10) and an injector assembly (20), wherein:

the fluidic microstructure (10) comprises a plurality of fluidic microchannels (12) and at least one microchannel input port (14) and at least one microchannel output port (16), each in fluid communication with the fluidic microchannels (12);

the injector assembly (20) comprises a liquid inlet (22), a gas inlet (24), a liquid outlet (26), a gas outlet (28), a liquid flow portion (30) extending from the liquid inlet (22) to the liquid outlet (26), and a gas flow portion (40) extending from the gas inlet (24) to the gas outlet (28);

the injector assembly (20) defines an injection interface with the microchannel input port (14) of the fluidic microstructure (10);

the injector assembly (20) is configured such that the gas outlet (28) of the gas flow portion (40) is positioned to inject gas into the liquid flow portion (30) upstream of the liquid outlet (26), into the liquid flow portion (30) at the liquid outlet (26), or into an extension (35) of the liquid flow portion (30) downstream of the liquid outlet (26); and the injector assembly (20) is configured such that gas is injected into the liquid flow portion (30) or the extension thereof as a series of gas bubbles, the microreactor assembly (100) further comprising a plurality of fluidic microstructures (10) and the injector assembly (20) defining an additional interface with a microchannel output port (16) of an additional fluidic microstructure (10) such that the liquid flow portion (30) extends from the microchannel output port (16) to the microchannel input port (14), wherein the microreactor assembly (100) comprises a plurality of active or passive assembly clamping mechanisms (70) configured to cooperate with respective fluidic microstructures (10) and injector assemblies so as to engage the injector assemblies and the fluidic microstructures (10) at respective injection interfaces.

3. A microreactor assembly (100) comprising a fluidic microstructure (10) and an injector assembly (20), wherein:

the fluidic microstructure (10) comprises a plurality of fluidic microchannels (12) and at least one microchannel input port (14) and at least one microchannel output port (16), each in fluid communication with the fluidic microchannels (12);

the injector assembly (20) comprises a liquid inlet (22), a gas inlet (24), a liquid outlet (26), a gas outlet (28), a liquid flow portion (30) extending from the liquid inlet (22) to the liquid outlet (26), and a gas flow portion (40) extending from the gas inlet (24) to the gas outlet (28);

the injector assembly (20) defines an injection interface with the microchannel input port (14) of the fluidic microstructure (10);

the injector assembly (20) is configured such that the gas outlet (28) of the gas flow portion (40) is positioned to inject gas into the liquid flow portion (30) upstream of the liquid outlet (26), into the liquid flow portion (30) at the liquid outlet (26), or into an extension (35) of the liquid flow portion (30) downstream of the liquid outlet (26); and the injector assembly (20) is configured such that gas is injected into the liquid flow portion (30) or the extension thereof as a series of gas bubbles, wherein the injector assembly (20) comprises a rotary body portion (21) and a static body portion (23) and is configured to permit active orientation of the gas inlet (24), relative to a remainder of the injector assembly (20), without disruption of the injection interface.

4. A microreactor assembly (100) comprising a fluidic microstructure (10) and an injector assembly (20), wherein:

the fluidic microstructure (10) comprises a plurality of fluidic microchannels (12) and at least one microchannel input port (14) and at least one microchannel output port (16), each in fluid communication with the fluidic microchannels (12);

the injector assembly (20) comprises a liquid inlet (22), a gas inlet (24), a liquid outlet (26), a gas outlet (28), a liquid flow portion (30) extending from the liquid inlet (22) to the liquid outlet (26), and a gas flow portion (40) extending from the gas inlet (24) to the gas outlet (28);

the injector assembly (20) defines an injection interface with the microchannel input port (14) of the fluidic microstructure (10);

the injector assembly (20) is configured such that the gas outlet (28) of the gas flow portion (40) is positioned to inject gas into the liquid flow portion (30) upstream of the liquid outlet (26), into the liquid flow portion (30) at the liquid outlet (26), or into an extension (35) of the liquid flow portion (30) downstream of the liquid outlet (26); and the injector assembly (20) is configured such that gas is injected into the liquid flow portion (30) or the extension thereof as a series of gas bubbles, wherein the injector assembly (20) comprises an interchangeable flow regulating unit (60) comprising the gas outlet (28) and forming at least a part of the liquid flow portion (30) and the gas flow portion (40).

5. An injector assembly (20) comprising a liquid inlet (22), a gas inlet (24), a liquid outlet (26), a gas outlet (28), a liquid flow portion (30) extending from the liquid inlet (22) to the liquid outlet (26), and a gas flow portion (40) extending from the gas inlet (24) to the gas outlet (28); wherein:

the liquid inlet (22) is configured to define a sealed, readily engageable and disengageable interface with a liquid reactant supply;

the gas inlet (24) is configured to define a sealed, readily engageable and disengageable interface with a gas reactant supply;

the injector assembly (20) is configured such that the gas outlet (28) of the gas flow portion (40) is positioned to inject gas into the liquid flow portion (30) upstream of the liquid outlet (26), into the liquid flow portion (30) at the liquid outlet (26), or into an extension (35) of the liquid flow portion (30) downstream of the liquid outlet (26);

the injector assembly (20) is configured such that gas is injected into the liquid flow portion (30) or the extension thereof as a series of gas bubbles; and the injector assembly (20) defines an injection interface at the liquid outlet (26), the injection interface being configured to form an interface with an input port of a fluidic microstructure (10).

* * * * *